(12) United States Patent
Suzuki et al.

(10) Patent No.: US 8,099,290 B2
(45) Date of Patent: Jan. 17, 2012

(54) VOICE RECOGNITION DEVICE

(75) Inventors: Tadashi Suzuki, Tokyo (JP); Yasushi Ishikawa, Tokyo (JP); Yuzo Maruta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/119,445

(22) PCT Filed: Oct. 20, 2009

(86) PCT No.: PCT/JP2009/005488
§ 371 (c)(1),
(2), (4) Date: Mar. 17, 2011

(87) PCT Pub. No.: WO2010/086928

PCT Pub. Date: Aug. 5, 2010

(65) Prior Publication Data

US 2011/0166859 A1    Jul. 7, 2011

(30) Foreign Application Priority Data

Jan. 28, 2009  (JP) .................................. 2009-016783

(51) Int. Cl.
*G10L 15/18* (2006.01)

(52) U.S. Cl. ............ 704/277; 704/270; 704/9; 704/251; 704/250; 704/257

(58) Field of Classification Search .................. 704/275, 704/270.1, 251, 235, 260, 277, 3, 9, 231, 704/257, 254, 270, 239, 246, 243, 250, 249
See application file for complete search history.

(56) References Cited

U.S. PATENT DOCUMENTS

| | | | |
|---|---|---|---|
| 5,640,490 A * | 6/1997 | Hansen et al. ................ | 704/254 |
| 6,088,669 A * | 7/2000 | Maes ............................ | 704/231 |
| 6,219,641 B1 * | 4/2001 | Socaciu ........................ | 704/251 |
| 6,219,646 B1 * | 4/2001 | Cherny ........................ | 704/277 |
| 6,324,513 B1 * | 11/2001 | Nagai et al. .................. | 704/275 |
| 7,035,805 B1 * | 4/2006 | Miller .......................... | 704/275 |
| 7,177,806 B2 * | 2/2007 | Washio ........................ | 704/226 |
| 7,340,390 B2 * | 3/2008 | Hurst et al. ....................... | 704/8 |
| 7,606,714 B2 * | 10/2009 | Williams et al. .............. | 704/275 |
| 2002/0111805 A1 | 8/2002 | Goronzy et al. | |
| 2002/0128820 A1 | 9/2002 | Goronzy et al. | |
| 2004/0015356 A1 * | 1/2004 | Nakamura et al. ............ | 704/250 |
| 2005/0105712 A1 * | 5/2005 | Williams et al. ......... | 379/265.02 |
| 2007/0219804 A1 * | 9/2007 | Asayama ...................... | 704/275 |
| 2008/0270129 A1 * | 10/2008 | Colibro et al. ............... | 704/236 |
| 2009/0055167 A1 * | 2/2009 | Moon ............................... | 704/9 |
| 2010/0235341 A1 * | 9/2010 | Bennett ........................ | 707/706 |

FOREIGN PATENT DOCUMENTS

| | | |
|---|---|---|
| JP | 2001-282788 A | 10/2001 |
| JP | 2002-247646 A | 8/2002 |
| JP | 2002-304190 A | 10/2002 |
| JP | 2003-022087 A | 1/2003 |
| JP | 2004-101727 A | 4/2004 |

* cited by examiner

*Primary Examiner* — Vijay B Chawan
(74) *Attorney, Agent, or Firm* — Birch, Stewart, Kolasch & Birch, LLP

(57) ABSTRACT

A voice recognition unit is constructed in such a way as to create a voice label string for an inputted voice uttered by a user inputted for each language on the basis of a feature vector time series of the inputted voice uttered by the user and data about a sound standard model, and register the voice label string into a voice label memory 2 while automatically switching among languages for a sound standard model memory 1 used to create the voice label string, and automatically switching among the languages for the voice label memory 2 for holding the created voice label string by using a first language switching unit SW1 and a second language switching unit SW2.

7 Claims, 12 Drawing Sheets

VOICE RECOGNITION DEVICE

FIELD OF THE INVENTION

The present invention relates to a voice recognition device. More particularly, it relates to a voice recognition device that can perform voice recognition using registered voices which a user has uttered even when switching to a language which the voice recognition device uses for the voice recognition.

BACKGROUND OF THE INVENTION

Most of recently developed voice recognition devices and voice recognition systems are intended for unspecified speakers, and it is therefore unnecessary for a user to register his or her voices which the user wants a voice recognition device or a voice recognition system to recognize into the equipment beforehand. More specifically, instead of uttering a voice, the user can register his or her voice which the user wants the voice recognition device or system to recognize into the equipment by simply inputting kana characters from a keyboard or the like in the case of Japanese. Furthermore, also in the case of a foreign language, by simply allowing the user to input a word which the user wants the voice recognition device or system to recognize into the equipment, the conventional voice recognition device or system can create a phonetic symbol of the word automatically, and register the word as a recognition object word.

However, there is a case in which the user registers his or her uttered voice into the voice recognition device or system to use the word as a recognition object word, depending on an application to which voice recognition is applied (this case will be referred to as creation of a user dictionary from here on). For example, there are a case in which the user registers a radio station name corresponding to the frequency of a radio station by voice, and a case in which the user registers the name of a person or a place name corresponding to a telephone number by voice.

Furthermore, voice recognition mounted in equipment, such as a car navigation or a mobile terminal, which is used over a plurality of countries requires a function of switching among languages. In general, invoice recognition, voice data are collected for each language, and a voice uttered by a user is recognized by using a recognition algorithm and a sound standard model which are constructed using the data. Switching among languages requires switching among voice recognition units and switching among sound standard models.

In an application as mentioned above which registers a voice uttered by a user and uses this voice as a recognition object, because each created user dictionary depends on a voice recognition algorithm and a sound standard model, when switching among voice recognition units and switching among sound standard models are done in order to switch among languages, the user needs to perform an operation of registering his or her voices again because some already-created user dictionaries cannot be used.

To solve this problem, conventionally, some measures have been provided. For example, patent reference 1 discloses electronic dictionary equipment for and an electronic dictionary equipment using language switching method of determining a language which a user wants to use by comparing a voice uttered by the user with words stored in the system when switching among using languages for an electronic dictionary, and a storage medium used for the electronic dictionary equipment. Furthermore, patent reference 2 discloses a mobile terminal device for and a computer program for determining a language which a user wants to use by comparing a voice uttered by the user with words stored in the system when switching among using languages for an electronic dictionary.

[Related Art Document]
Patent Reference
Patent reference 1: JP,2001-282788,A
Patent reference 2: JP,2002-247646,A

SUMMARY OF THE INVENTION

In the electronic dictionary equipment, the electronic dictionary equipment using language switching method, and the storage medium which are disclosed by above-mentioned patent reference 1, a language which a user wants to use is determined by comparing a voice uttered by the user with words stored in the system when switching among the using languages for the electronic dictionary. A problem is therefore that the user cannot create a dictionary corresponding to each language from his or her uttered voices.

Furthermore, the mobile terminal device and the computer program which are disclosed by patent reference 2 are aimed at downloading appropriate dictionary data at the time when the user enters a different linguistic area. A problem is therefore that the user cannot create a user dictionary corresponding to each language from his or he uttered voices.

The present invention is made in order to solve the above-mentioned problem, and it is therefore an object of the present invention to provide a voice recognition device that creates voice label strings corresponding to registered voices uttered by a user for each language and stores the voice label strings as a user dictionary, and that even when switching among languages to use one of them for voice recognition, can perform voice recognition using the registered voices uttered by the user.

In accordance with the present invention, there is provided a voice recognition device including: a sound standard model memory for storing a plurality of sound standard models corresponding respectively to a plurality of languages which are recognition objects; a voice label memory for storing a plurality of user dictionaries corresponding respectively to a plurality of languages; a first language switching unit for switching among a plurality of languages for the sound standard model memory to select one of the plurality of languages; a second language switching unit for switching among the plurality of languages for the voice label memory to select one of the plurality of languages; a control unit for causing the first language switching unit and the second language switching unit to switch in synchronization with each other; an acoustic analysis unit for performing an acoustic analysis process on an inputted voice uttered by a user to output a feature vector time series of the voice uttered by the user; and a voice recognition unit for creating a voice label string for the inputted voice uttered by the user on a basis of both the feature vector time series from the acoustic analysis unit, and data about a sound standard model corresponding to the language for the sound standard model memory which is selected by the first language switching unit while the first language switching unit is caused to switch, and registering the voice label string with the language for the voice label memory which is selected by the second language switching unit in synchronization with the first language switching unit.

The voice recognition device in accordance with the present invention is constructed in such a way as to create a voice label string for an inputted voice uttered by a user for each language on the basis of the feature vector time series of the inputted voice uttered by the user and the data about the sound standard model corresponding to the language for the sound standard model memory which is selected by the first language switching unit, and register the voice label string with the language for the voice label memory which is selected by the second language switching unit while automatically switching among the languages for the sound standard model memory storing the sound standard models corresponding respectively to the languages which are recognition objects, and automatically switching among the languages for the voice label memory storing the user dictionaries corresponding respectively to the languages by using the first language switching unit and the second language switching unit which work in synchronization with each other. The voice recognition unit can thus create a voice label string corresponding to each voice uttered by the user for each language, and hold the voice label string as a user dictionary. As a result, even when changing the language which is used for voice recognition, the voice recognition unit can carry out voice recognition using voices uttered by the user by using the user dictionary.

EMBODIMENTS OF THE INVENTION

Hereafter, the preferred embodiments of the present invention will be explained in detail with reference to the drawings.

Embodiment 1

Figure 1:
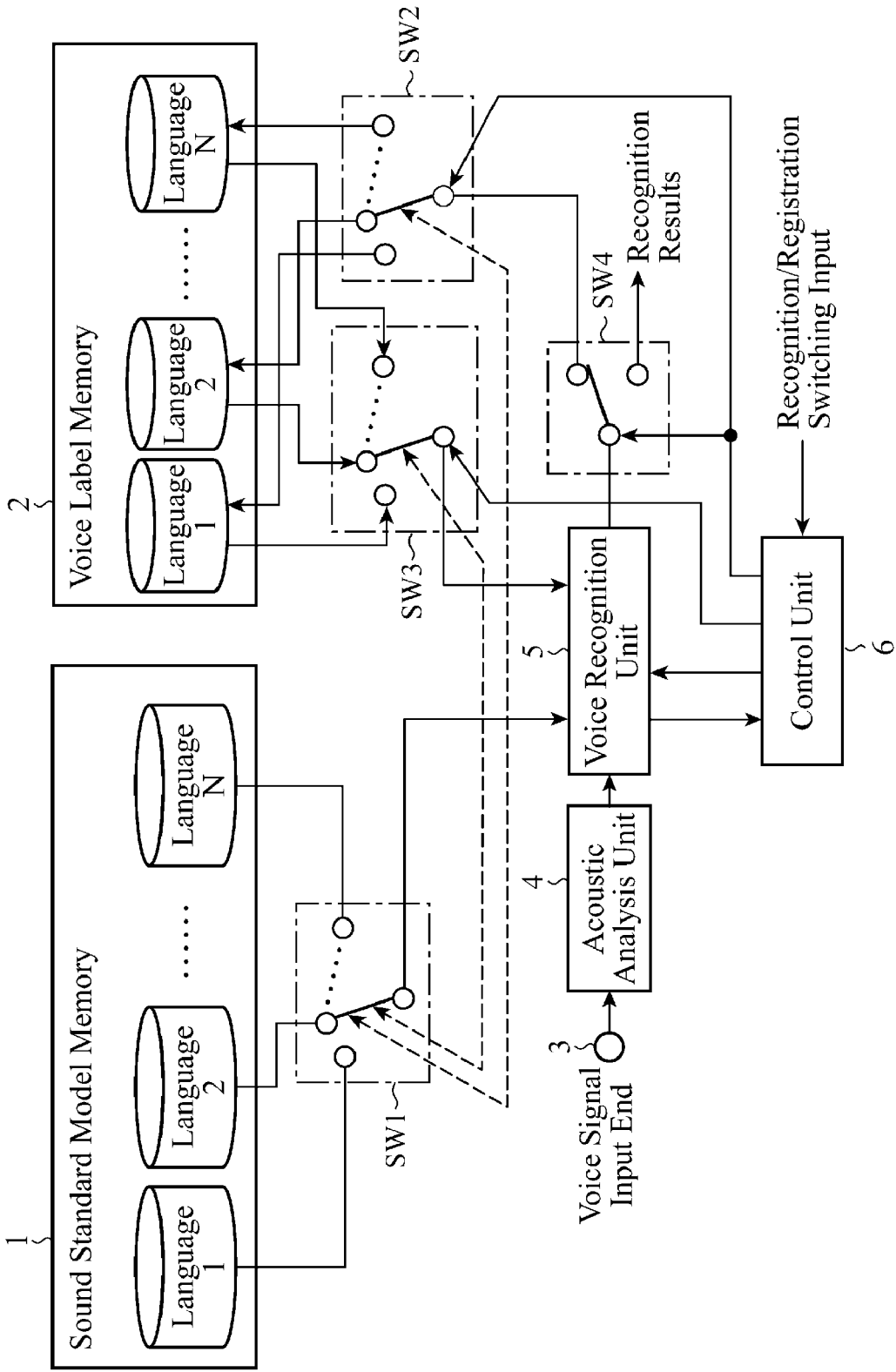
FIG. 1 is a block diagram showing the structure of a voice recognition device in accordance with Embodiment 1.

FIG. 1 is a block diagram showing the structure of a voice recognition device in accordance with Embodiment 1. The voice recognition device is provided with a sound standard model memory 1, a voice label memory 2, an acoustic analysis unit 4 connected to a voice signal input end 3, a voice recognition unit 5, a control unit 6, language switching units SW1 to SW3, and a recognition/registration switching unit SW4.

The sound standard model memory 1 stores a plurality of sound standard models corresponding respectively to a plurality of languages (from a language 1 to a language N) which are recognition objects.

The voice label memory 2 stores a plurality of user dictionaries corresponding respectively to the plurality of languages (from the language 1 to the language N). The user dictionaries are held in the voice label memory with them being associated respectively with the plurality of languages (from the language 1 to the language N).

The acoustic analysis unit 4 performs an acoustic analysis process on a voice uttered by a user and inputted thereto via the voice signal input end 3, and outputs either a power spectrum of the inputted voice uttered by the user or a time series of feature quantity which is similar to the power spectrum as a feature vector time series.

When creating a user dictionary, the voice recognition unit 5 receives, as an input, the feature vector time series outputted from the acoustic analysis unit 4, uses the data stored in the sound standard model memory 1 which is selected by the language switching unit SW1 to determine a voice label string corresponding to the feature vector time series, and stores, as the user dictionary, the voice label string in one of user dictionary storage destinations corresponding respectively to the languages 1 to N which is selected by the language switching unit SW2.

Furthermore, when carrying out a voice recognition process, the voice recognition unit 5 receives, as an input, the feature vector time series outputted from the acoustic analysis unit 4, uses the data stored in the sound standard model memory 1 which is selected by the language switching unit SW1 and the user dictionary corresponding to the language which is selected by the language switching unit SW3 to perform the voice recognition process on the above-mentioned feature vector time series, and outputs the recognition results by way of the recognition/registration switching unit SW4.

The control unit 6 carries out a switching control operation of switching the recognition/registration switching unit SW4 to recognition according to a recognition change command inputted from outside the voice recognition device, and, when carrying out registration, i.e., user dictionary creation, switches the language switching unit SW2 in response to a switching request signal which the voice recognition unit 5 generates at the time when the feature vector time series from the acoustic analysis unit 4 has a break. At this time, the language switching unit SW1 which works in synchronization with the language switching unit SW2 switches.

In contrast, when carrying out the voice recognition process, the control unit carries out a switching control operation of switching the recognition/registration switching unit SW4 to registration according to a registration change command inputted outside the voice recognition device, and also switches the language switching unit SW2 in such a way that this language switching unit SW2 selects a language specified from outside the voice recognition device. At this time, the language switching unit SW1 which works in synchronization with the language switching unit SW2 switches.

The language switching unit SW1 selectively outputs the data about one of the plurality of sound standard models which corresponds to one language, the plurality of data about the plurality of sound standard models corresponding respectively to the plurality of languages (from the language 1 to the language N) being stored in the sound standard model memory 1.

When creating a user dictionary, the language switching unit SW2 switches among the languages 1 to N to select one of the user dictionary storage destinations in the voice label memory in synchronization with the language switching unit SW1.

When carrying out voice recognition, the language switching unit SW3 switches among the languages 1 to N to select one of the user dictionary reading sources in the voice label memory in synchronization with the language switching unit SW1.

When receiving a user dictionary creation command from outside the recognition/registration switching unit SW4, the recognition/registration switching unit SW4 switches to the connection with the language switching unit SW2, whereas when receiving a voice recognition command from outside the recognition/registration switching unit SW4, the recognition/registration switching unit SW4 switches to the connection with an output terminal.

Figure 2:
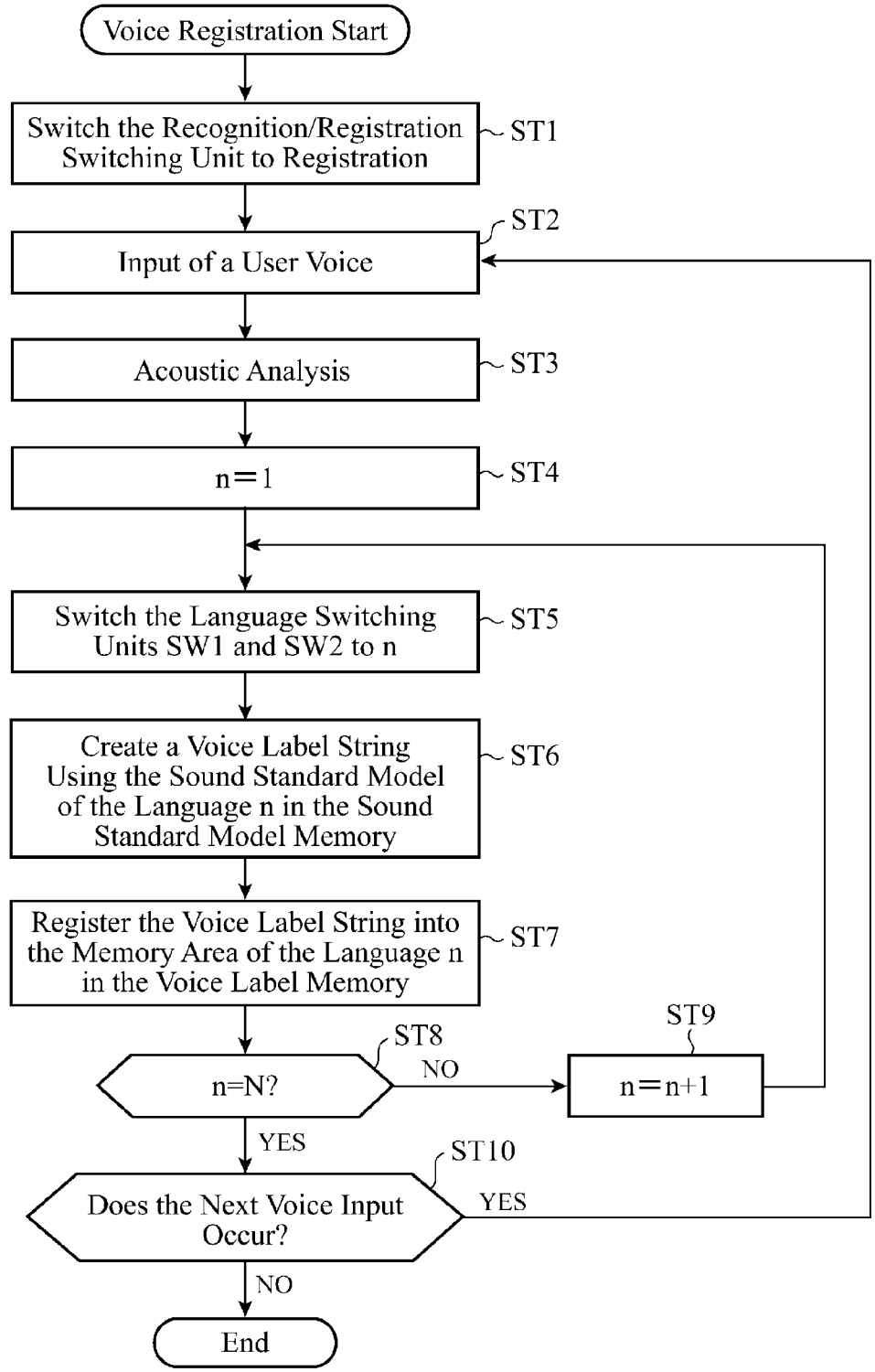
FIG. 2 is a flowchart explaining a process of creating a user dictionary with reference to an operation at the time of voice registration in accordance with Embodiment 1.

Next, the operation of the voice recognition device will be explained. FIG. 2 is a flow chart explaining a process of creating a user dictionary with reference to an operation at the time of voice registration in accordance with Embodiment 1. When creating a user dictionary, the control unit 6 switches the recognition/registration switching unit SW4 to registration to connect the recognition/registration switching unit SW4 with the language switching unit SW2 according to a user dictionary creation command inputted from outside the voice recognition device (step ST1). As a result, the output destination of a voice label string which the voice recognition unit 5 outputs is set to the voice label memory 2.

Next, a voice for registration which is uttered by a user is inputted to the voice recognition device via the voice signal input end 3 (step ST2). The acoustic analysis unit 4 performs acoustic analysis on the inputted voice signal, and outputs a feature vector time series (step ST3). Subsequently, the voice recognition device substitutes an initial value of 1 into a variable n (step ST4). The voice recognition device then causes the language switching unit SW1 and the language switching unit SW2 to switch according to the variable n. As a result, the sound standard model in the sound standard model memory 1 corresponding to the language shown by the variable n is selected, and the user dictionary storage destination in the voice label memory 2 corresponding to the language shown by the variable n is selected simultaneously (step ST5).

The voice recognition unit 5 receives, as an input, the feature vector time series from the acoustic analysis unit 4, and creates a voice label string by using the data stored in the sound standard model memory 1 corresponding to the language shown by the variable n in the sound standard model memory 1 (step ST6). Then, the above-mentioned voice label string which is created by the voice recognition unit 5 is registered, via the recognition/registration switching unit SW4 and the language switching unit SW2, into the user dictionary storage destination corresponding to the language shown by the variable n in the voice label memory 2 (step ST7).

The voice recognition device determines if the variable n matches the number of languages N (step ST8), and, if the variable n does not match the number of languages N, substitutes n+1 into n and then returns to step ST5 (step ST9). In contrast, if the variable n matches the number of languages N, the voice recognition device shifts the process to step ST10.

The voice recognition device, in step ST10, determines if the next voice input for registration occurs, and when the user utters the next voice for registration, returns to step ST2. In contrast, when the user does not utter the next voice for registration, the voice recognition device ends the process of creating a user dictionary.

By carrying out the above-mentioned process, the voice recognition device automatically registers a voice for registration, which the user utters in order to register the voice into the voice recognition device, into the voice label memory 2 as user dictionaries corresponding respectively to the languages 1 to N by using the data stored in the sound standard model memory 1 similarly corresponding to the languages 1 to N.

Figure 3:
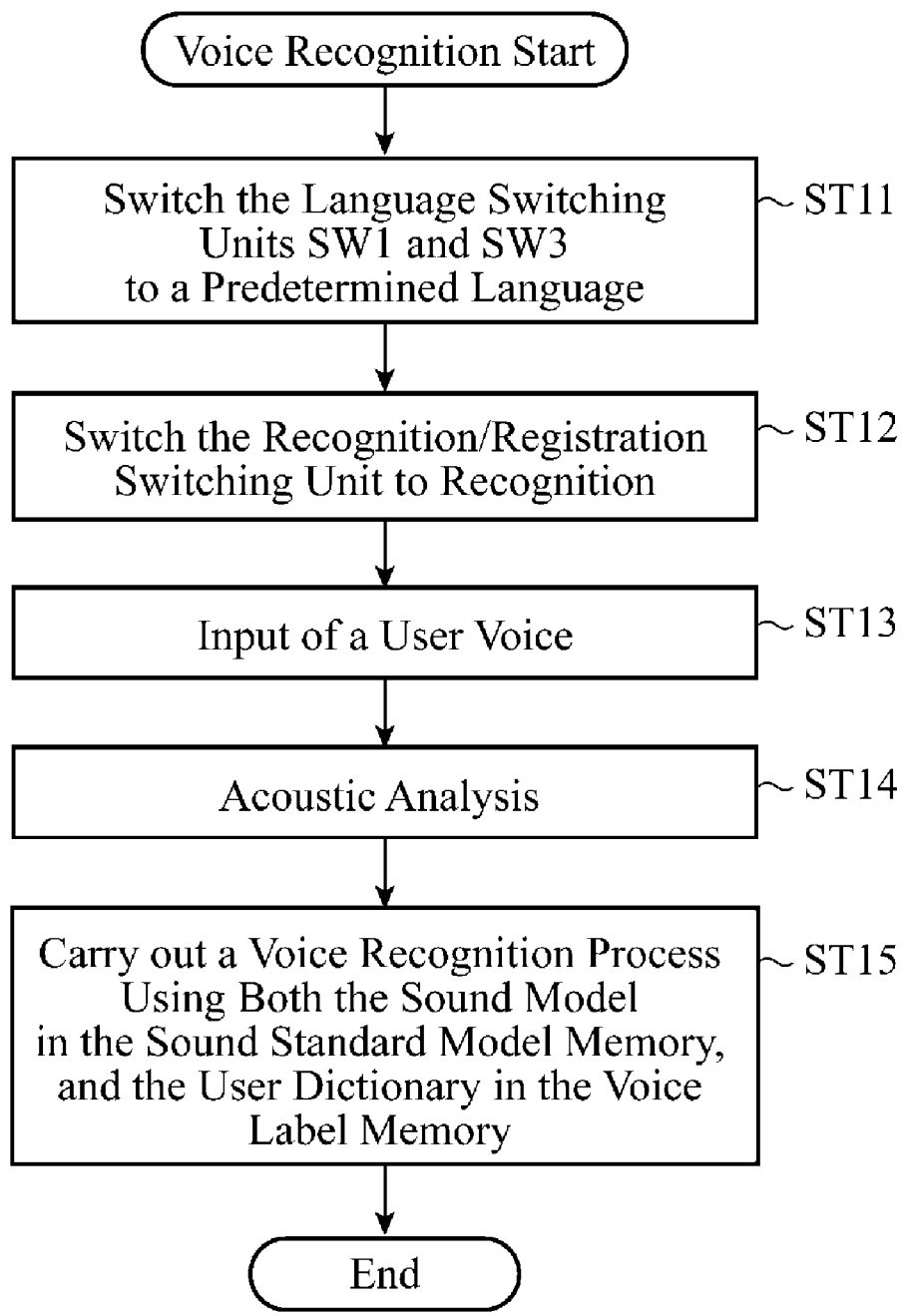
FIG. 3 is a flow chart explaining an operation of carrying out voice recognition with reference to a process at the time of voice recognition in accordance with Embodiment 1.

FIG. 3 is a flow chart explaining an operation of carrying out voice recognition with reference to a process of carrying out voice recognition in accordance with Embodiment 1. First, the control unit 6 causes the language switching unit SW1 and the language switching unit SW3 to switch in synchronization with each other in such a way that the voice recognition device can recognize a predetermined language according to a voice recognition command which is inputted thereto from outside the voice recognition device (step ST11). In the above-mentioned example shown, the control unit selects one of the languages to N. The control unit then switches the recognition/registration switching unit SW4 to the connection with the output in such away that the voice recognition device can output the recognition results (step ST12).

A voice uttered by the user is then inputted to the voice recognition device via the voice signal input end 3 as an unknown inputted voice (step ST13). The acoustic analysis unit 4 performs acoustic analysis on the unknown inputted voice inputted thereto and outputs a feature vector time series (step ST14). The voice recognition unit 5 receives, as an input, the feature vector time series acquired in step ST14, carries out a recognition process using both the data stored in the sound standard model memory 1 corresponding to the language selected in step ST11 according to this feature vector time series, and the user dictionary registered in the voice label memory 2 (step ST15), outputs the recognition results via the recognition/registration switching unit SW4, and then ends the voice recognition process.

Even in a state in which any one of the languages 1 to N is selected as the target language to be recognized, the voice recognition device can carry out voice recognition using a user dictionary which consists of voices for registration which the user has uttered by performing the above-mentioned operation.

As previously mentioned, the voice recognition device in accordance with Embodiment 1 creates a voice label string corresponding to a voice to be registered, which is uttered by a user, for each language and holds the voice label string as a user dictionary by carrying out the process of creating and holding the voice label string for the inputted voice while automatically switching among the languages for the sound standard model memory which is used in order to create voice label strings, and automatically switching among the languages for the voice label memory for holding the created voice label strings by using the first language switching unit and the second language switching unit. As a result, even when changing the language which is used for voice recognition, the voice recognition device can carry out voice recognition using the registered voices which the user has uttered.

Embodiment 2

Figure 4:
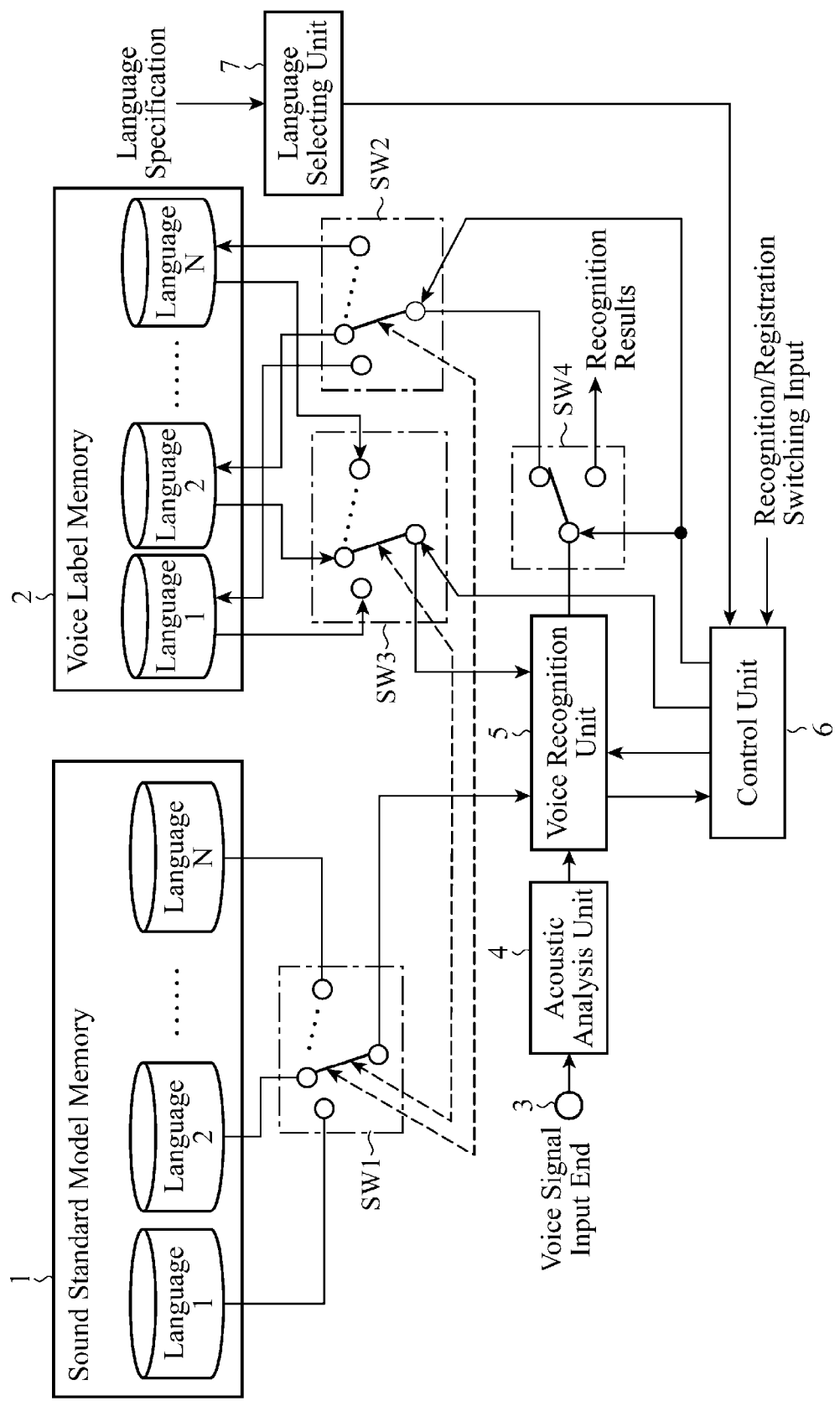
FIG. 4 is a block diagram showing the structure of a voice recognition device in accordance with Embodiment 2.

FIG. 4 is a block diagram showing the structure of a voice recognition device in accordance with Embodiment 2. The voice recognition device in accordance with this embodiment includes a language selecting unit 7 in addition to the structure in accordance with Embodiment 1 shown in FIG. 1, and the other structural components of the voice recognition device are the same as those of Embodiment 1 shown in FIG. 1 and hence a duplicate explanation of the components will be omitted hereafter.

The language choice unit 7 selects a language according to language specification data inputted by a user and informs the language to a control unit 6. The control unit 6 controls either a language switching unit SW1 and a language switching unit SW2 or the language switching unit SW1 and a language switching unit SW3 according to the language informed thereto in such a way that they switch in synchronization with each other.

Figure 5:
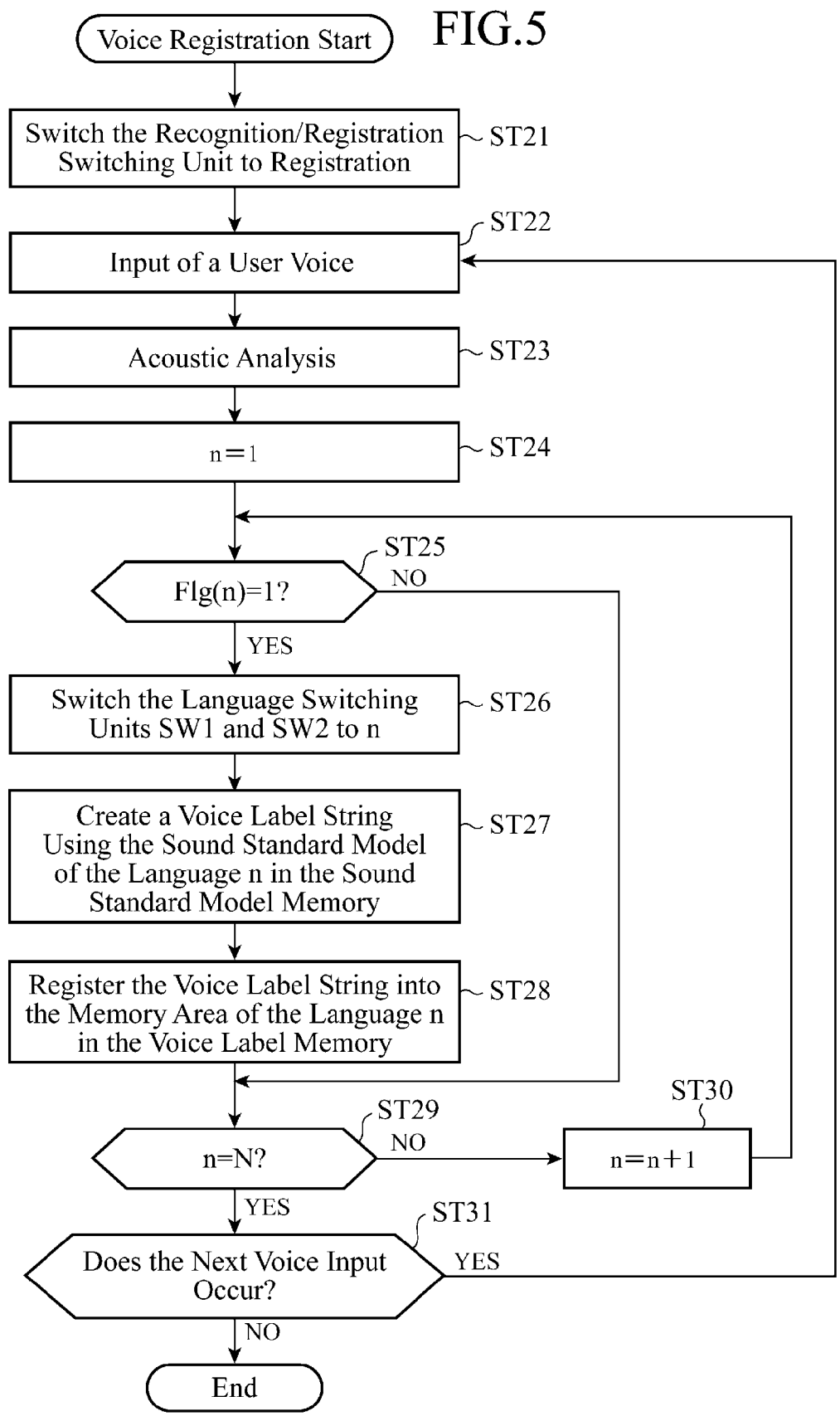
FIG. 5 is a flowchart explaining a process of creating a user dictionary with reference to an operation at the time of voice registration in accordance with Embodiment 2.

Next, the operation of the voice recognition device will be explained. FIG. 5 is a flow chart explaining a process of creating a user dictionary in accordance with Embodiment 2. Because operations in steps ST21 to ST24 are the same as those in steps ST1 to ST4 in accordance with Embodiment 1, a duplicate explanation of the operations will be omitted hereafter.

Then, by using the language specification data FIg(m) (the language specification data is defined for m=1, ..., N and has a value of 0 or 1), the language selecting unit 7 determines if FIg(n)=1 (step ST25), and makes a transition to an operation of step ST26 if FIg(n)=1, or makes a transition to an operation of step ST29 if FIg(n)=0. Hereafter, because operations in steps ST26 to ST31 are the same as those in steps ST5 to ST10 in accordance with Embodiment 1, a duplicate explanation of the operations will be omitted hereafter.

With the above-mentioned structure and by performing the above-mentioned operations, the voice recognition device automatically registers a voice for registration, which the user utters in order to register the voice into the voice recognition device, into a voice label memory 2 for the language n which satisfies FIg(n)=1 in the language specification data FIg(m) (m=1, ..., N) by using a sound standard model memory 1 corresponding to the language n, as a user dictionary similarly corresponding to this language n. As a result, the voice recognition device can avoid creating user dictionaries for all the N languages by simply setting FIg(n)=1 only for the language n which the user uses, thereby being able to shorten the time required for the user dictionary creation. Furthermore, the capacity of the voice label memory 2 for storing the user dictionaries can also be saved.

Figure 6:
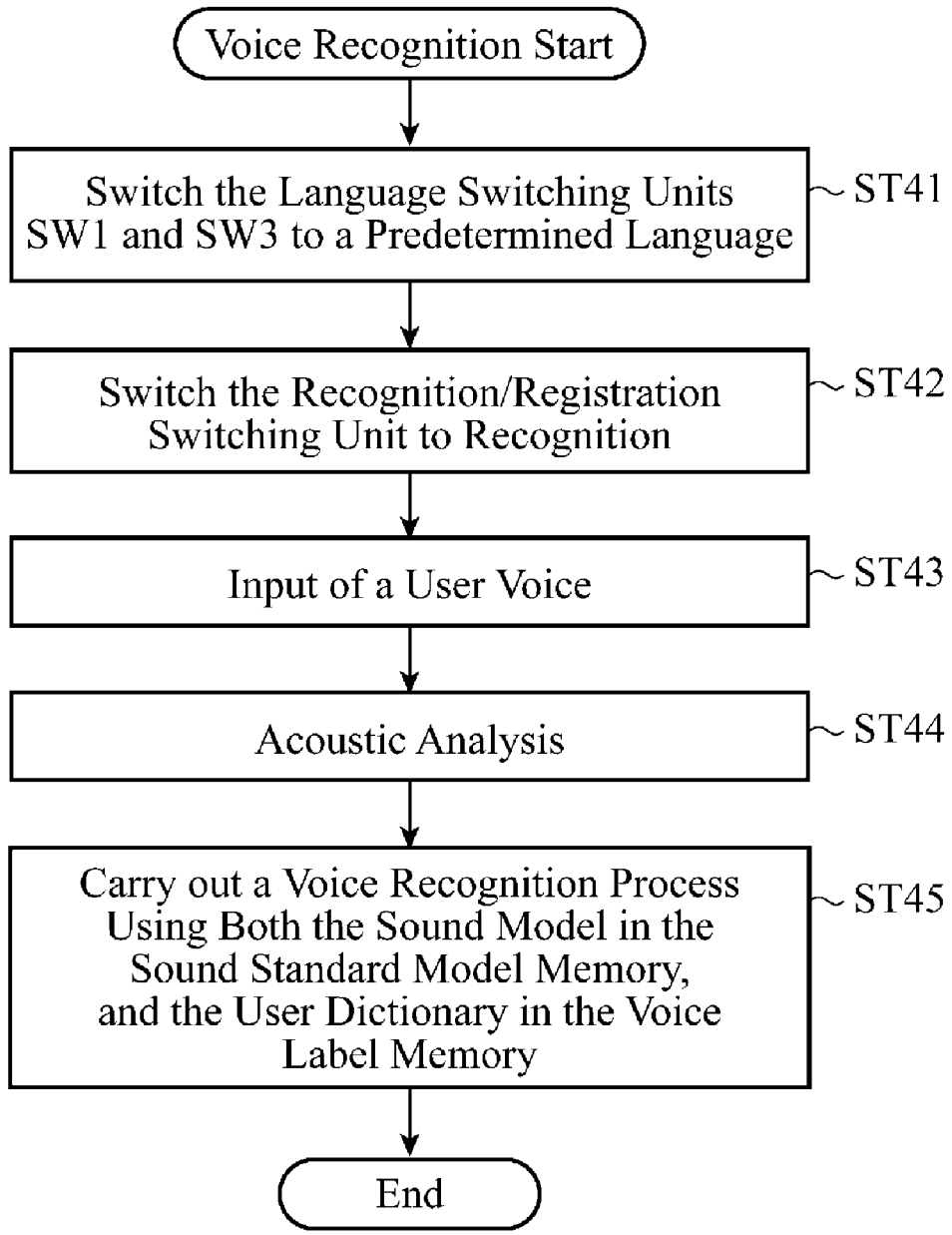
FIG. 6 is a flow chart explaining an operation of carrying out voice recognition with reference to a process at the time of voice recognition in accordance with Embodiment 1.

FIG. 6 is a flow chart explaining an operation of carrying out voice recognition using the user dictionaries created as mentioned above. The language selecting unit 7 commands the control unit 6 to be able to recognize a voice in the language n which satisfies FIg(n)=1 in the language specification data. The control unit 6 sets the language switching unit SW1 and the language switching unit SW3 according to the command in such a way that they switch to the predetermined language in synchronization with each other (step ST41). The control unit also switches the recognition/registration switching unit SW4 to recognition (step ST42). Hereafter, because operations in steps ST43 to ST45 are the same as those in steps ST13 to ST15 in accordance with Embodiment 1, a duplicate explanation of the operations will be omitted hereafter.

Even in a case in which the language n which can be specified by the language specification data, i.e., whose flag FIg(n) is set to 1 is set as the target language to be recognized, the voice recognition device can carry out voice recognition using the user dictionary which consists of voices for registration which the user has uttered by performing the above-mentioned operation.

Thus, because the voice recognition device in accordance with Embodiment 2 is constructed in such a way as to cause the language switching unit SW1 and the language switching unit SW2 which work in synchronization with each other to switch according to the language specification data provided thereto from outside the voice recognition device, the voice recognition device can selectively create a user dictionary only for the language according to the language specification data provided by the user or the system. Therefore, the voice recognition device can shorten the time required for the dictionary creation. Furthermore, the amount of usage of the voice label memory 2 can be reduced.

Embodiment 3

Figure 7:
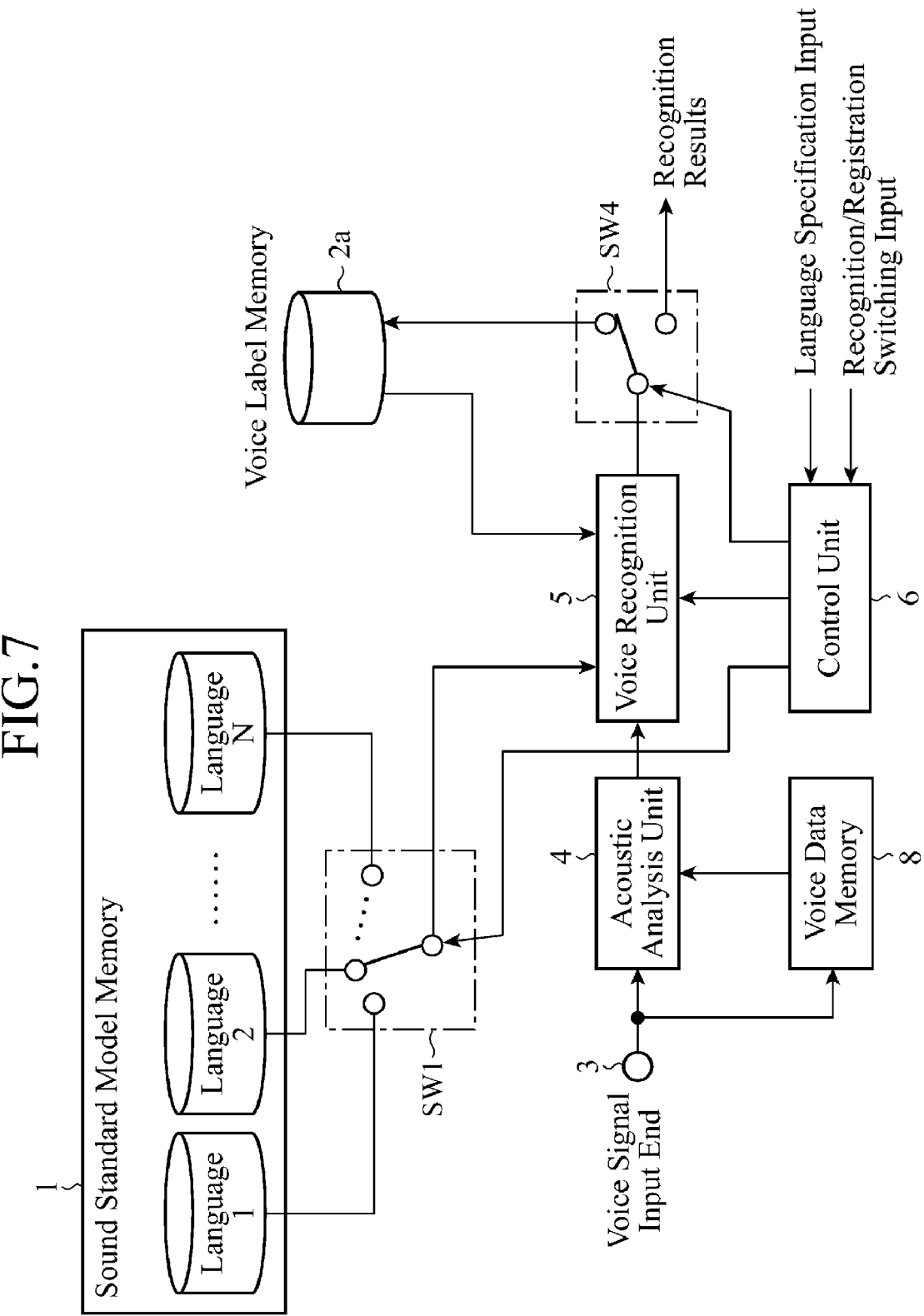
FIG. 7 is a block diagram showing the structure of a voice recognition device in accordance with Embodiment 3.

FIG. 7 is a block diagram showing the structure of a voice recognition device in accordance with Embodiment 3 of the present invention. A voice label memory 2a stores a user dictionary corresponding to a certain language n (n=1 to N) for only the single language. A voice data memory 8 records and stores a voice which is inputted thereto via a voice signal input end 3. Because other components including a sound standard model memory 1, the voice signal input end 3, an acoustic analysis unit 4, a voice recognition unit 5, a control unit 6, a language switching unit SW1, and a recognition/registration switching unit SW4 are the same as those in the structure in accordance with Embodiment 1 shown in FIG. 1, a duplicate explanation of the components will be omitted hereafter.

Figure 8:
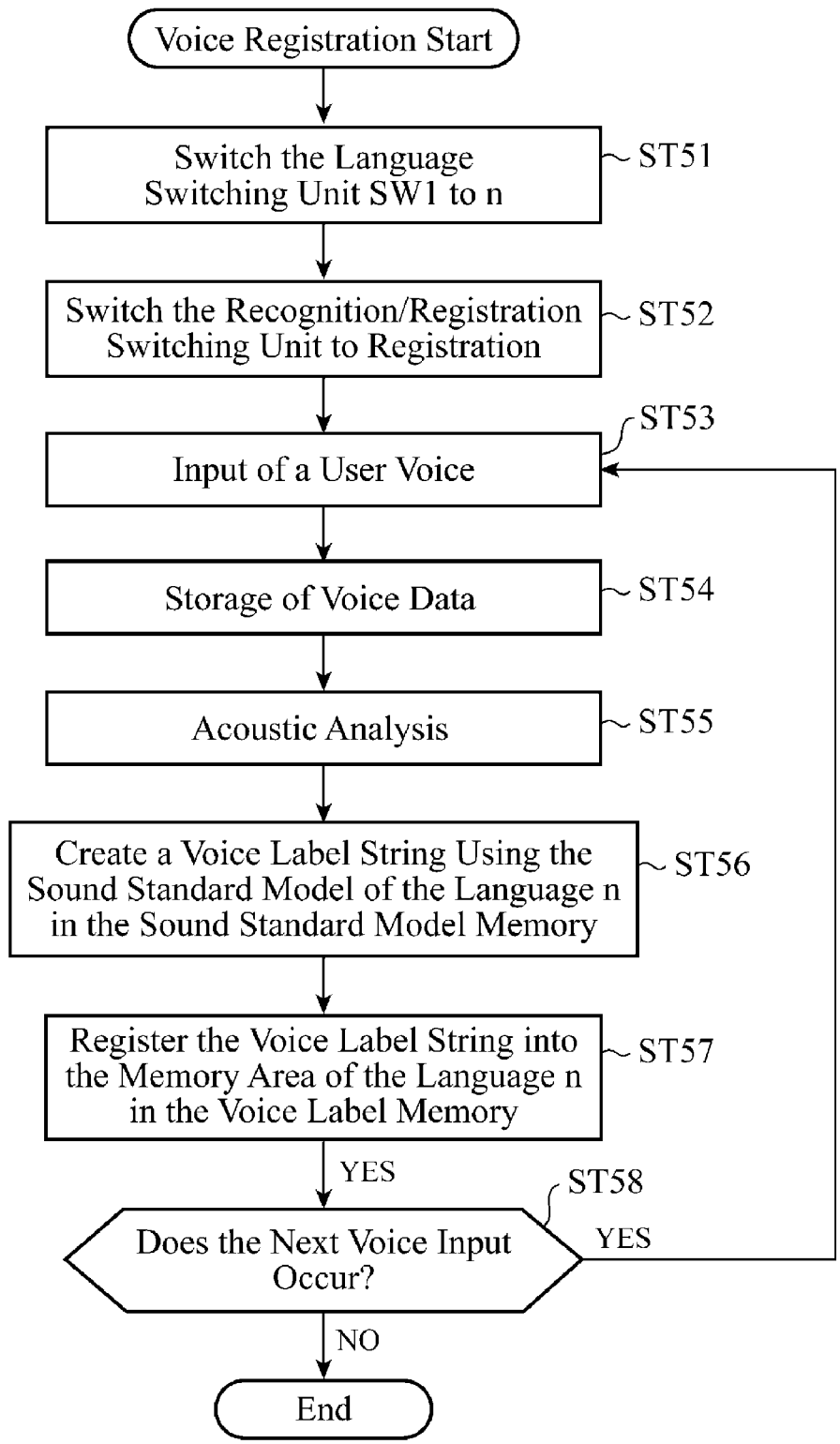
FIG. 8 is a flowchart explaining a process of creating a user dictionary with reference to an operation in the case of carrying out first-time user dictionary creation for a language n in accordance with Embodiment 3.

Next, the operation of the voice recognition device will be explained. FIG. 8 is a flow chart explaining a process of creating a user dictionary with reference to an operation of carrying out first-time user dictionary creation for the language n in accordance with Embodiment 3.

First, the control unit 6 switches the language switching unit SW1 to a position at which the language switching unit selects a language n according to the selection of the language n which is informed thereto from outside the voice recognition device in such a way that the control unit creates a user dictionary for the language n (step ST51). Next, the control unit switches the recognition/registration switching unit SW4 to registration (step ST52). As a result, the output destination of a voice label string which the voice recognition unit 5 outputs is set to the voice label memory 2a.

Then, a voice for registration which is uttered by a user is inputted to the voice recognition device via the voice signal input end 3 (step ST53). The inputted voice for registration is stored into the voice data memory 8 (step ST54). Furthermore, the acoustic analysis unit 4 performs acoustic analysis on the inputted voice signal for registration, and outputs a feature vector time series to the voice recognition unit 5 (step ST55).

The voice recognition unit 5 inputs the above-mentioned feature vector time series, and determines a voice label string using the data about a sound standard model corresponding to the language shown by the variable n in the sound standard model memory 1 (step ST56). The above-mentioned voice label string which the voice recognition unit 5 has created is registered, as a user dictionary, into the voice label memory 2a via the recognition/registration switching unit SW4 (step ST57). The control unit then determines whether or not the next voice for registration occurs (step ST58), and, when the user has uttered the next voice for registration, returns to step ST53 and repeats the above-mentioned operations in steps ST53 to ST57. When the user has not uttered anymore voice for registration, the control unit ends the user dictionary creating process.

The above-mentioned process is the one carried out for the first-time voice registration for the language n. Through the series of operations, while the voice data about the voices for registration uttered by the user are stored in the voice data memory 8, the user dictionary corresponding to the language n is registered in the voice label memory 2a.

Figure 9:
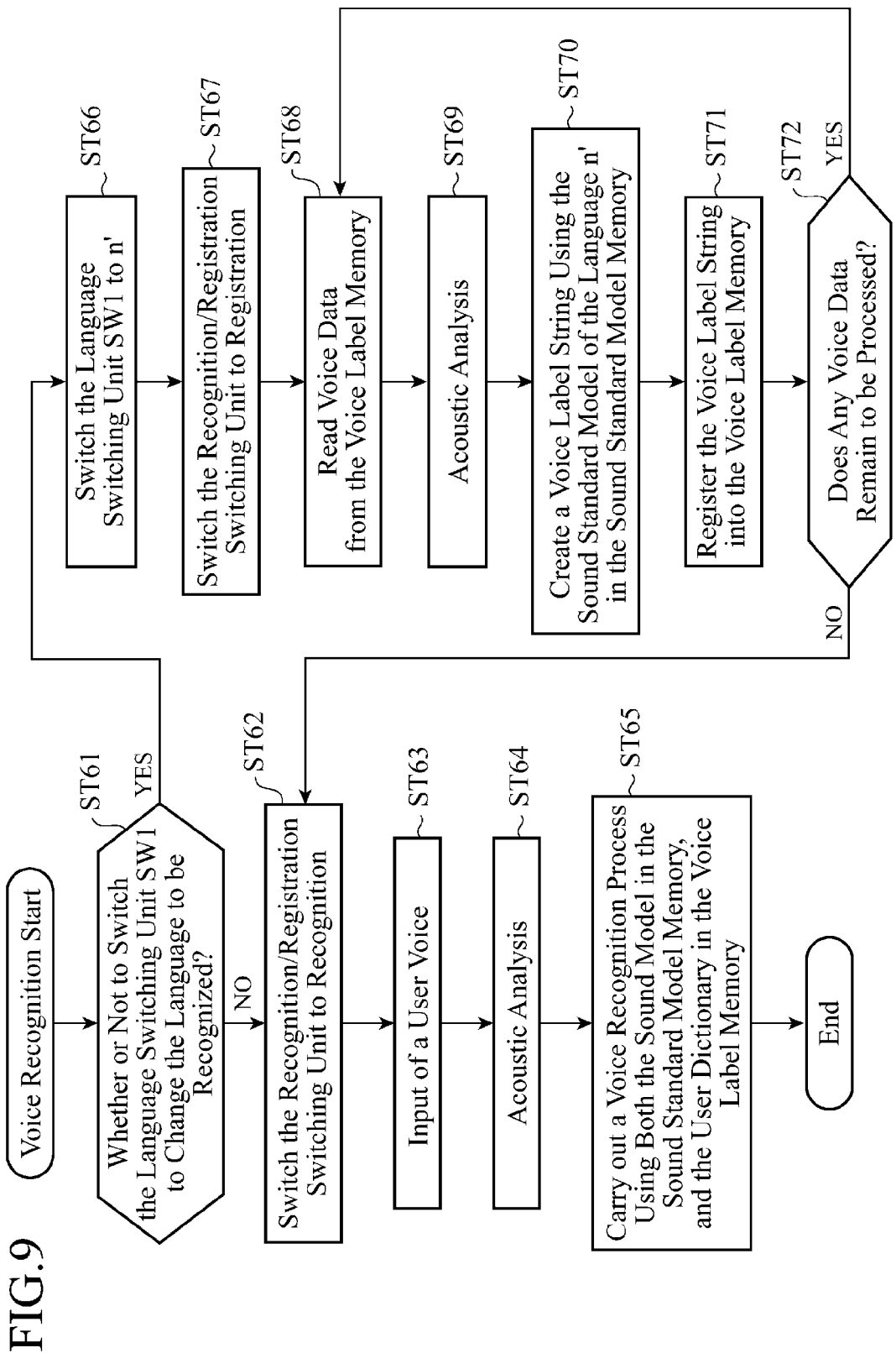
FIG. 9 is a flow chart explaining an operation of carrying out voice recognition in a state in which a user dictionary corresponding to the language n is registered in a voice label memory in accordance with Embodiment 3.

FIG. 9 is a flow chart explaining an operation of performing voice recognition on a voice for registration uttered by the user in a state in which the voice data about the voices for registration uttered by the user are stored in the voice data memory 8, and the user dictionary corresponding to the language n is registered in the voice label memory 2a, as mentioned above.

First, the control unit 6 determines whether or not to switch the language switching unit SW1 to change the language to be recognized according to a voice recognition command which is inputted thereto from outside the voice recognition device (step ST61). When the control unit does not have to change the language to be recognized, i.e., the language switching unit SW1 keeps the selection of the language n, the control unit shifts to an operation of step ST62. Instep ST62, the control unit switches the recognition/registration switching unit SW4 to recognition. A voice uttered by a user is then inputted to the voice recognition device via the voice signal input end 3 as an unknown inputted voice (step ST63). The acoustic analysis unit 4 performs acoustic analysis on the unknown inputted voice inputted thereto and outputs a feature vector time series to the voice recognition unit 5 (step ST64). The voice recognition unit 5 receives, as an input, the feature vector time series acquired in step ST64, carries out a recognition process using both the data stored in the sound standard model memory 1 corresponding to the language n and the user dictionary registered in the voice label memory 2a (step ST65), outputs the recognition results via the recognition/registration switching unit SW4, and then ends the voice recognition process.

An operation in the case of, in step ST61, switching the language switching unit SW1 to a language other than the language n will be explained hereafter. In this case, the control unit shifts the process to an operation of step ST66, and switches the language switching unit SW1 to a language n' other than the language n. The control unit then switches the recognition/registration switching unit SW4 to registration (step ST67).

The acoustic analysis unit 4 reads voice data stored in the voice label memory 2a (step ST68). The acoustic analysis unit 4 then determines a feature vector time series corresponding to the read voice data, and outputs the feature vector time series to the voice recognition unit 5 (step ST69). The voice recognition unit 5 receives, as an input, the feature vector time series acquired in step ST69, and creates a voice label string by using the data about the sound standard model in the sound standard model memory 1 corresponding to the language n' selected in step ST66 (step ST70).

The voice recognition unit then registers the created voice label string, as a user dictionary, into the voice label memory 2a (step ST71). The control unit then checks if any voice data remains to be processed in steps ST69 to ST71 (step ST72), and, if voice data remains to be processed, returns to step ST68 and repeatedly performs the operations of step ST69 to ST71 on the remaining voice data. Unless any voice data remains to be processed, the control unit shifts the process to the operation in step ST62. Because the operations in step ST62 and subsequent steps are the same as the above-mentioned operations performed in the case in which the language switching unit SW1 is held at the language n without being switched, a duplicate explanation of the operations will be omitted.

When switching to a language n', the voice recognition device promptly creates a user dictionary corresponding to the language n' by using the voice data recorded in the voice data memory 8 and stores the user dictionary in the voice label memory 2a through the above-mentioned operations. Therefore, also when the language n' is selected in the voice recognition device, the voice recognition device can carry out voice recognition using the user dictionary. Furthermore, in accordance with Embodiment 3 as mentioned above, because the voice label memory 2a ensures only a memory area equivalent to one language, the capacity of the memory can be reduced.

As mentioned above, because the voice recognition device in accordance with Embodiment 3 includes the voice data memory 8 for holding the registered voices uttered by the user to enable the acoustic analysis unit 4 to carry out acoustic analysis by using the above-mentioned registered voices, the voice recognition device can eliminate the necessity to ensure a memory area for each language in the voice label memory 2a, and, even when the language which the voice recognition system uses is changed, can use the registered voices uttered by the user which are recorded in the voice data memory 8 to create a user dictionary corresponding to the selected language and carry out voice recognition using this user dictionary.

Embodiment 4

Figure 10:
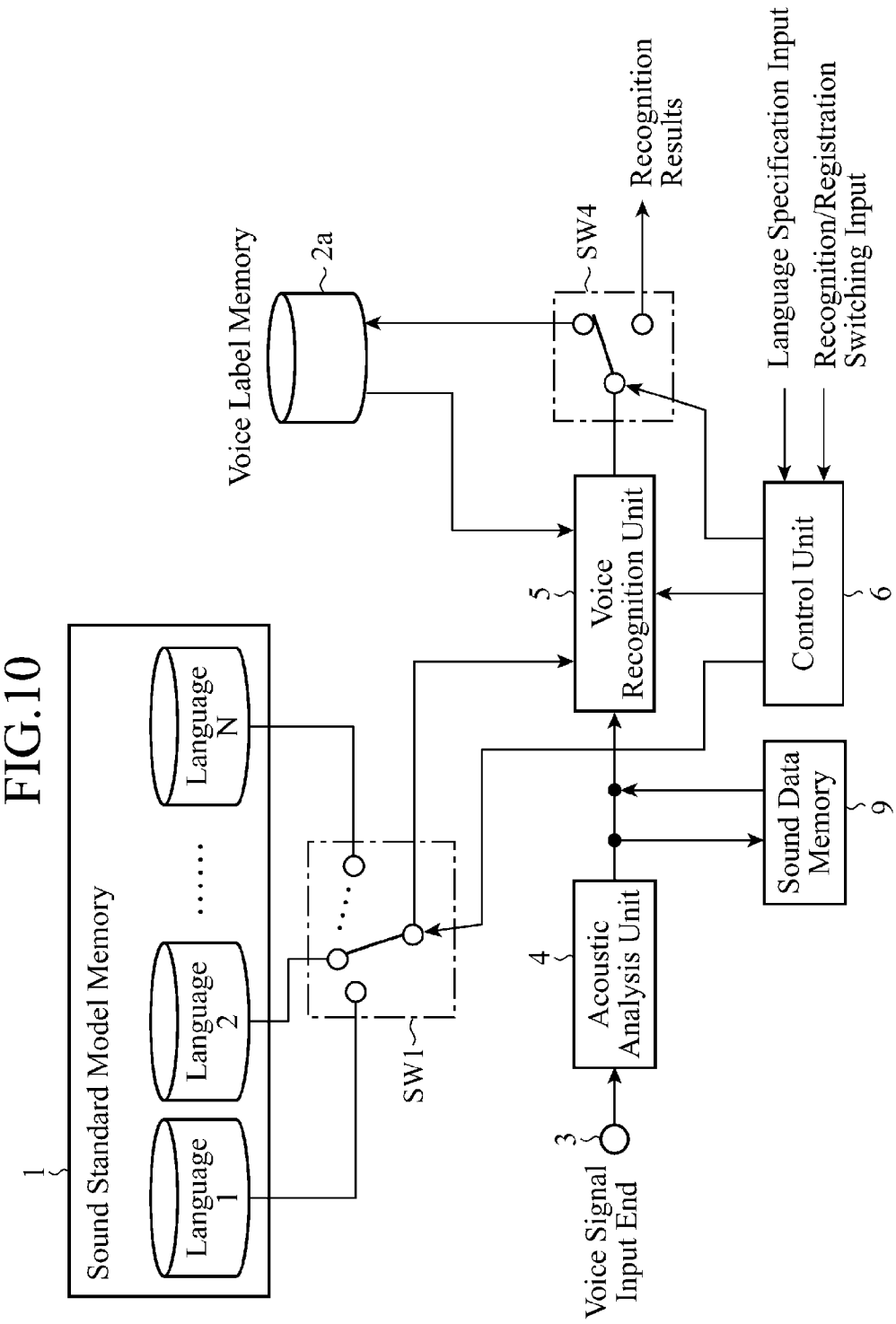
FIG. 10 is a block diagram showing the structure of a voice recognition device in accordance with Embodiment 4.

FIG. 10 is a block diagram showing the structure of a voice recognition device in accordance with Embodiment 4 of the present invention. The voice recognition device has a sound data memory 9 for recording and storing a feature vector time series which an acoustic analysis unit 4 outputs for a voice for registration uttered by a user, instead of the voice data memory 8 in accordance with Embodiment 3. Since the other structural components of the voice recognition device are the same as those in the structure in accordance with Embodiment 3, a duplicate explanation of the other structural components will be omitted hereafter.

Next, an operation of carrying out voice recognition in a state in which a feature vector time series corresponding to a voice for registration uttered by a user is stored in the sound data memory 9, and a user dictionary corresponding to a language n is registered in a voice label memory 2a will be explained.

Figure 11:
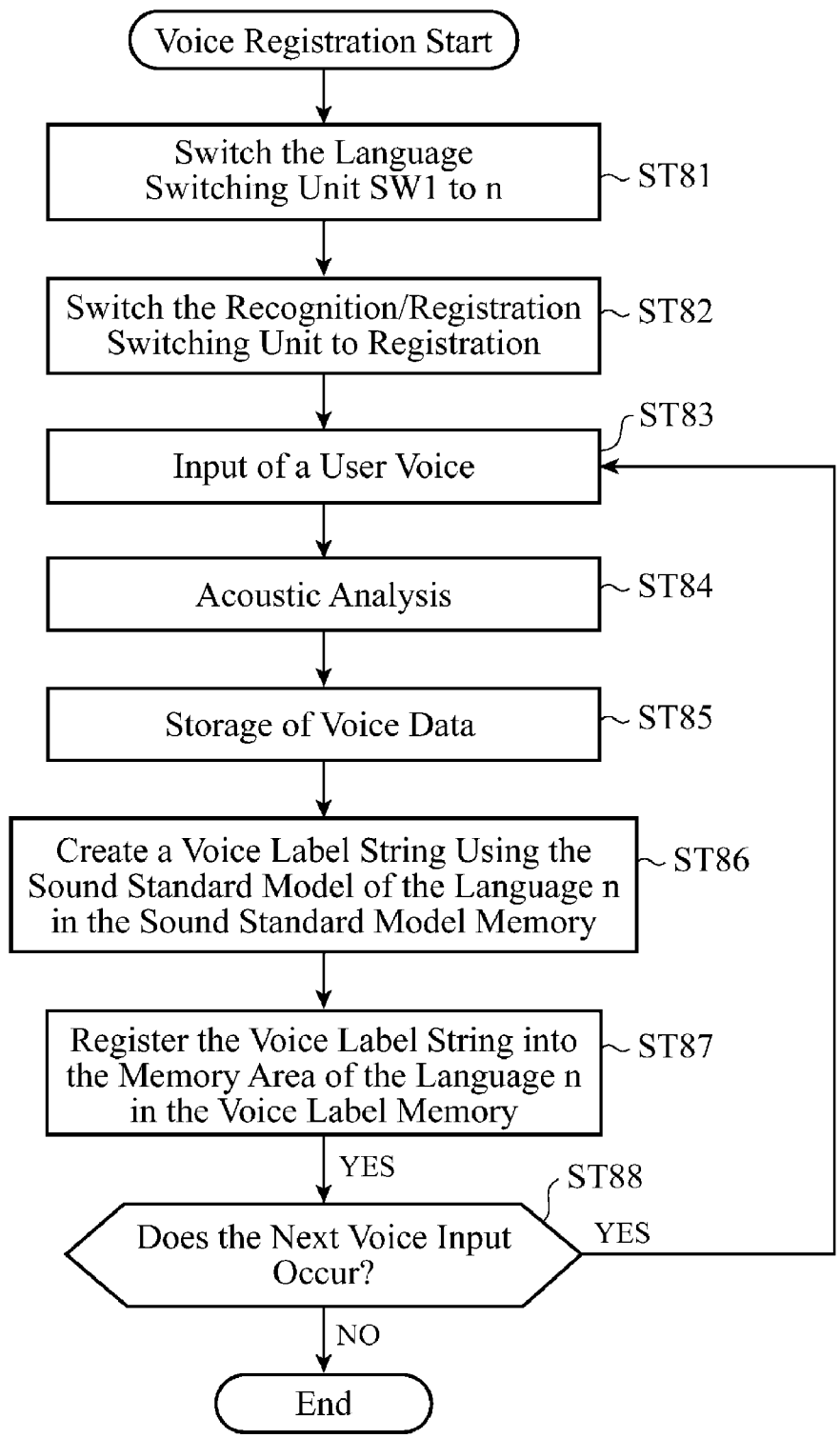
FIG. 11 is a flow chart explaining a process of creating a user dictionary corresponding to a language n by using user's voices for registration in accordance with Embodiment 4.

FIG. 11 is a flow chart explaining a process of creating a user dictionary corresponding to the language n by using voices for registration uttered by a user with reference to (a case of carrying out first-time user dictionary creation for the language n) in accordance with Embodiment 4. First, the voice recognition device switches a language switching unit SW1 to the language n for which the voice recognition device carries out creation of a user dictionary (step ST81).

The voice recognition device then switches a recognition/registration switching unit SW4 to registration (step ST82). As a result, the output destination of a voice label string which a voice recognition unit 5 outputs is set to the voice label memory 2a. Then, a voice for registration which is uttered by a user is inputted to the voice recognition device via a voice signal input end 3 (step ST83). The acoustic analysis unit 4 performs acoustic analysis on the inputted voice signal for registration, and outputs a feature vector time series to the voice recognition unit 5 (step ST84).

The feature vector time series acquired in step ST84 is recorded and stored in the sound data memory 9 (step ST85). The voice recognition unit 5 receives, as an input, the above-mentioned feature vector time series, and creates a voice label string using the data about a sound standard model corresponding to the language shown by the variable n in a sound standard model memory 1 (step ST86).

The above-mentioned voice label string which the voice recognition unit 5 has created is registered, as a user dictionary, into the voice label memory 2a via the recognition/registration switching unit SW4 (step ST87). The control unit then determines whether or not the next voice for registration occurs, and, when the user has uttered the next voice for registration, returns to step ST83 and repeats the operations insteps ST83 to ST88. When the user has not uttered anymore voice for registration, the control unit ends the user dictionary creating process (step ST88).

The above-mentioned process is the one carried out for the first-time voice registration for the language n. Through the series of operations, while the feature vector time series of voices for registration uttered by the user are stored in the sound data memory 9, the user dictionary corresponding to the language n is registered into the voice label memory 2a.

Figure 12:
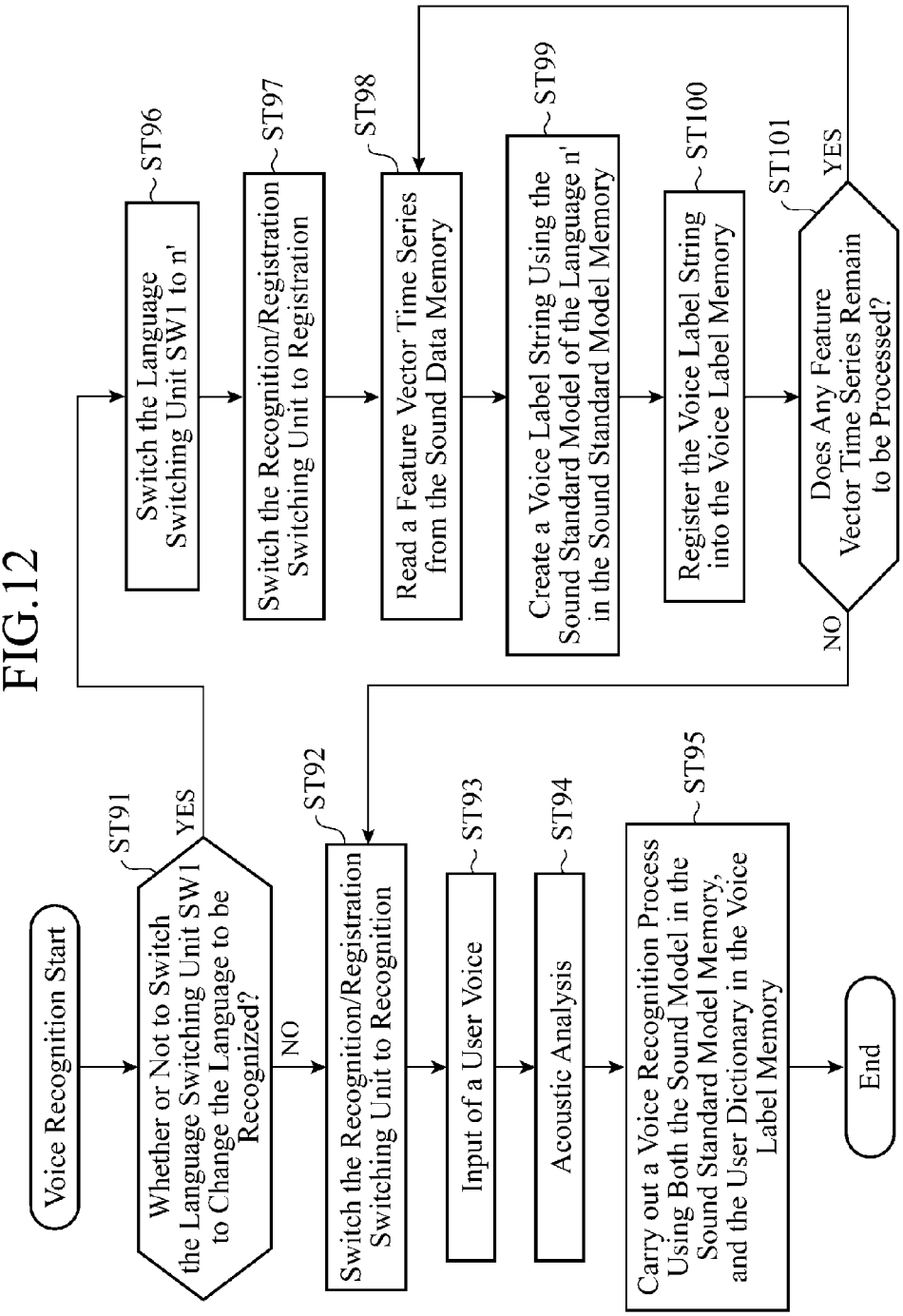
FIG. 12 is a flow chart explaining an operation of carrying out voice recognition in a state in which a user dictionary corresponding to the language n is registered in a voice label memory in accordance with Embodiment 4.

FIG. 12 is a flow chart explaining an operation of performing voice recognition on a voice for registration uttered by the user in a state in which the feature vector time series of the voice is stored in the sound data memory 9, and the user dictionary corresponding to the language n is registered in the voice label memory 2a, as mentioned above.

First, the control unit 6 determines whether or not to switch the language switching unit SW1 to change the language to be recognized according to a voice recognition command which is inputted thereto from outside the voice recognition device (step ST91). When the language switching unit SW1 keeps the selection of the language n, the control unit shifts to an operation of step ST92. The control unit, in this step ST92, switches the recognition/registration switching unit SW4 to recognition. A voice uttered by a user is then, in step ST93, inputted to the voice recognition device via the voice signal input end 3 as an unknown inputted voice. The acoustic analysis unit 4 performs acoustic analysis on the unknown inputted voice inputted thereto and outputs a feature vector time series to the voice recognition unit 5 (step ST94).

The voice recognition unit 5 receives, as an input, the feature vector time series acquired in step ST94, carries out a recognition process using both the data stored in the sound standard model memory 1 corresponding to the language n and the user dictionary registered in the voice label memory 2 (step ST95), outputs the recognition results via the recognition/registration switching unit SW4.

Next, when, in step ST91, changing the selection by the language switching unit SW1 to a language other than the language n, the control unit shifts to step ST96, and switches the language switching unit SW1 to a language n' other than the language n and also switches the recognition/registration switching unit SW4 to registration (step ST97). The voice recognition unit 5 reads the feature vector time series corresponding to a voice for registration stored in the sound data memory 9 (step ST98).

The voice recognition unit 5 then receives, as an input, the read feature vector time series, and creates a voice label string by using the data about the sound standard model corresponding to the language n' selected in step ST96 (step ST99). The voice recognition unit then registers the acquired voice label string, as a user dictionary, into the voice label memory 2a via the recognition/registration switching unit SW4 (step ST100).

The control unit then checks if any feature vector time series remains to be processed in steps ST99 to ST100 in the sound data memory 9 (step ST101), and, if a feature vector time series remains to be processed, returns to step ST98 and repeatedly performs the operations of step ST99 to ST101 on the remaining voice data. Unless any feature vector time series remains to be processed, the control unit shifts the process to an operation in step ST92. Because the operations in step ST92 and subsequent steps are the same as the above-mentioned operations performed in the case in which the language switching unit SW1 is held at the language n without being switched, a duplicate explanation of the operations will be omitted.

When switching to a language n', the voice recognition device promptly creates a user dictionary corresponding to the language n' by using the feature vector time series recorded in the sound data memory 9 and stores the user dictionary in the voice label memory 2a through the above-mentioned operations. Therefore, also when the language n' is selected in the voice recognition device, the voice recognition device can carry out voice recognition using the user dictionary. Furthermore, in accordance with Embodiment 4, because the voice label memory 2a ensures only a memory area equivalent to one language, the capacity of the voice label memory can be reduced. In addition, because the voice recognition device includes the sound data memory 9 for storing the feature vector time series on which acoustic analysis has been performed, the voice recognition device can reduce the amount of arithmetic operations as compared with the case of Embodiment 3, and can speed up the user dictionary creating process.

Thus, the voice recognition device in accordance with Embodiment 4 holds the feature vector time series which the acoustic analysis unit 4 has acquired by carrying out acoustic analysis in the sound data memory 9, and creates a sound label string by using the above-mentioned feature vector time series held by this sound data memory 9 by means of the voice recognition unit 5. As a result, even when the language which the voice recognition system uses is changed, the voice recognition device can create a user dictionary corresponding to a selected language by using the feature vector time series of voices uttered by the user which are held by the sound data memory 9 without ensuring a memory area for each language in the voice label memory 2a, and can carry out voice recognition using this user dictionary.

INDUSTRIAL APPLICABILITY

Because the voice recognition device in accordance with the present invention can create a user dictionary for each language from voices uttered by a user, the voice recognition device in accordance with the present invention is suitable for use as a voice recognition device or the like which is used when the user wants to convert desired words into an equivalent in a foreign language and store them.

The invention claimed is:
1. A voice recognition device comprising:
a sound standard model memory for storing a plurality of sound standard models corresponding respectively to a plurality of languages which are recognition objects;
a voice label memory for storing a plurality of user dictionaries corresponding respectively to a plurality of languages;
a first language switching unit for switching among a plurality of languages for said sound standard model memory to select one of the plurality of languages;

a second language switching unit for switching among the plurality of languages for said voice label memory to select one of the plurality of languages;

a control unit for causing said first language switching unit and said second language switching unit to switch in synchronization with each other;

an acoustic analysis unit for performing an acoustic analysis process on an inputted voice uttered by a user to output a feature vector time series of said voice uttered by the user; and a voice recognition unit for creating a voice label string for said inputted voice uttered by the user on a basis of both the feature vector time series from said acoustic analysis unit, and data about a sound standard model corresponding to the language for said sound standard model memory which is selected by said first language switching unit while said first language switching unit is caused to switch, and registering said voice label string with the language for said voice label memory which is selected by said second language switching unit in synchronization with said first language switching unit.

2. The voice recognition device according to claim 1, wherein said voice recognition device includes a third language switching unit for switching among the plurality of languages for the voice label memory to select one of the plurality of languages, and a recognition/registration switching unit for selecting whether to output recognition results of the voice recognition unit to outside said voice recognition device or register the recognition results into the voice label memory, and wherein the control unit switches said recognition/registration switching unit to recognition according to an output command, and also causes the first language switching unit and said third language switching unit to switch in synchronization with each other, and the voice recognition unit reads a voice label for the inputted voice uttered by the user from said voice label memory on a basis of both the feature vector time series of said inputted voice uttered by the user, and the data about the sound standard model corresponding to the language for said sound standard model memory which is selected by said first language switching unit while said first language switching unit is caused to switch, and outputs the voice label via said recognition/registration switching unit.

3. The voice recognition device according to claim 1, wherein said voice recognition device includes a language selecting unit for selecting a language according to language specification data provided therefor from outside said voice recognition device, and the control unit causes the first language switching unit and the second language switching unit to switch in synchronization with each other in such a way that said first and second language switching units select a language corresponding to said language selected by said language selecting unit according to said language.

4. A voice recognition device comprising:
a sound standard model memory for storing a plurality of sound standard models corresponding respectively to a plurality of languages which are recognition objects;
a voice label memory for storing a user dictionary;
a first language switching unit for switching among a plurality of languages for said sound standard model memory to select one of the plurality of languages;
a control unit for switching said first language switching unit to a specified language selection position according to a specified language;
a voice data memory for holding a voice uttered by a user;
an acoustic analysis unit for performing an acoustic analysis process on an inputted voice uttered by the user or the voice uttered by the user which is read out of said voice data memory to output a feature vector time series of said voice uttered by the user; and a voice recognition unit for creating a voice label for the voice uttered by the user according to both data about a sound standard model corresponding to the language selected by said first language switching unit, and said feature vector time series, and registering said voice label into said voice label memory.

5. The voice recognition device according to claim 4, wherein said voice recognition device includes a recognition/registration switching unit for selecting whether to register recognition results of the voice recognition unit into the voice label memory or output the recognition results to outside said voice recognition device, and wherein the control unit switches said recognition/registration switching unit to recognition according to a recognition command, and also switches the first language switching unit, and the voice recognition unit reads a voice label for the inputted voice uttered by the user from said voice label memory on a basis of both the feature vector time series of said inputted voice uttered by the user, and the data about the sound standard model corresponding to the language for said sound standard model memory which is selected by said first language switching unit while said first language switching unit is caused to switch, and outputs the voice label via said recognition/registration switching unit.

6. A voice recognition device comprising:
a sound standard model memory for storing a plurality of sound standard models corresponding respectively to a plurality of languages which are recognition objects;
a voice label memory for storing a user dictionary;
a first language switching unit for switching among a plurality of languages for said sound standard model memory to select one of the plurality of languages;
a control unit for switching said first language switching unit to a specified language selection position according to a specified language;
an acoustic analysis unit for performing an acoustic analysis process on an inputted voice uttered by a user to output a feature vector time series of said voice uttered by the user;
a sound data memory for holding the feature vector time series which said acoustic analysis unit acquires by performing the acoustic analysis on the inputted voice uttered by the user; and
a voice recognition unit for creating a voice label for the voice uttered by the user according to both data about a sound standard model corresponding to the language selected by said first language switching unit, and the feature vector time series read out of said sound data memory, and registering said voice label into said voice label memory.

7. The voice recognition device according to claim 6, wherein said voice recognition device includes a recognition/registration switching unit for selecting whether to register recognition results of the voice recognition unit into the voice label memory or output the recognition results to outside said voice recognition device, and wherein the control unit switches said recognition/registration switching unit to recognition according to a recognition command, and also switches the first language switching unit, and the voice recognition unit reads a voice label for the inputted voice uttered by the user from said voice label memory on a basis of both the feature vector time series of said inputted voice uttered by the user, and the data about the sound standard model corresponding to the language for said sound standard model memory which is selected by said first language switching unit while said first language switching unit is caused to switch, and outputs the voice label via said recognition/registration switching unit.

* * * * *